United States Patent
Subbaraya et al.

(10) Patent No.: US 12,229,664 B2
(45) Date of Patent: Feb. 18, 2025

(54) OPTIMIZATION OF ARTIFICIAL NEURAL NETWORK (ANN) CLASSIFICATION MODEL AND TRAINING DATA FOR APPROPRIATE MODEL BEHAVIOR

(71) Applicant: Wipro Limited, Bangalore (IN)

(72) Inventors: Prashanth Krishnapura Subbaraya, Bengaluru (IN); Raghavendra Hosabettu, Bangalore (IN)

(73) Assignee: Wipro Limited, Bangalore (IN)

(*) Notice: Subject to any disclaimer, the term of this patent is extended or adjusted under 35 U.S.C. 154(b) by 1041 days.

(21) Appl. No.: 17/116,080

(22) Filed: Dec. 9, 2020

(65) Prior Publication Data
US 2022/0121929 A1    Apr. 21, 2022

(51) Int. Cl.
*G06N 3/08*    (2023.01)
*G06F 18/23*   (2023.01)
*G06F 18/24*   (2023.01)

(52) U.S. Cl.
CPC .............. *G06N 3/08* (2013.01); *G06F 18/23* (2023.01); *G06F 18/24* (2023.01)

(58) Field of Classification Search
CPC   G06N 3/08; G06N 3/02; G06N 3/045; G06N 3/0454; G06N 3/088; G06N 5/02; G06F 18/23; G06F 18/24; G06F 16/35
See application file for complete search history.

(56) References Cited

U.S. PATENT DOCUMENTS

| | | | |
|---|---|---|---|
| 10,719,301 B1* | 7/2020 | Dasgupta | G06F 8/34 |
| 2020/0134455 A1 | 4/2020 | Choi et al. | |
| 2020/0320399 A1* | 10/2020 | Huang | G06N 3/082 |
| 2020/0349154 A1* | 11/2020 | Puranam Hosudurg | G06F 16/2282 |

FOREIGN PATENT DOCUMENTS

| | | |
|---|---|---|
| CN | 108536678 A | 9/2018 |
| CN | 110837523 A | 2/2020 |

* cited by examiner

*Primary Examiner* — Dave Misir
(74) *Attorney, Agent, or Firm* — Finnegan, Henderson, Farabow, Garrett & Dunner, LLP

(57) ABSTRACT

This disclosure relates to method and system for optimizing artificial neural network (ANN) classification model and training data thereof for appropriate model behavior. The method may include extracting entities and domain specific entities from the training data for each of classes of the ANN classification mode, determining model parameters of the ANN classification model based on the training data, determining missing data with respect to the training data or the model parameters based on the entities and the domain specific entities for each the classes, iteratively analysing a relative advantage of a modified ANN classification model with a modified training data with respect to the ANN classification model with the training data, and determining an optimized ANN classification model and an optimized training data for appropriate model behavior based on the iterative analysis. The modified data may be generated based on the missing data.

17 Claims, 4 Drawing Sheets

OPTIMIZATION OF ARTIFICIAL NEURAL NETWORK (ANN) CLASSIFICATION MODEL AND TRAINING DATA FOR APPROPRIATE MODEL BEHAVIOR

TECHNICAL FIELD

This disclosure relates generally to artificial intelligence, and more particularly to method and system for optimization of artificial neural network (ANN) classification model and training data for appropriate model behavior.

BACKGROUND

Artificial neural network (ANN) may be employed in a wide variety of applications, including, but not limited to, computer vision, image recognition, natural language processing, speech recognition, and decision making. An ANN model may learn to perform a task by considering examples, generally without being programmed with any task-specific rules. For example, in image recognition, the ANN model may learn to identify specific objects in images by analyzing example images that may or may not have such specific objects. The example data (e.g., example images) are also referred to as training data as it is used to train the ANN model.

One of the challenges faced by the model builders is to understand behavior of ANN models to achieve the desired results. The inability to understand the reason behind the behavior results in a major reluctance to use the ANN models in business use-cases. The quality of the training data has a great impact on efficiency and/or accuracy of ANN models. For example, an insufficient training data produces models with inherited biases and poor accuracy, thereby limiting its utility. The training data should ideally address all kinds of variations with sufficient amount of data per variation. Thus, there has been a great interest to understand the how much training data is required by the ANN model and on how to optimize the ANN model to obtain the desired accuracy. An assessment of the quality of the training data plays a major role in determining the ANN model behavior. In particular, the assessment of the training data for data variations and data sufficiency is important so as to achieve desired model behavior and to improve the model efficiency.

Much of the current techniques disclose ways to process the training data so as to improve model accuracy. However, the current techniques are limited in their ability to help understand an impact of the training data on model behavior. For example, the current techniques do not provide a clear understanding on the quality of the training data (e.g., completeness or sufficiency of the data, coverage of variations in the data, etc.) for appropriate or desired model behavior. As will be appreciated, if the training data is used as it is without understanding the variations covered in it or the sufficiency of it, the ANN model has to be retrained vary frequently on a real-time basis so as to be accurate. Even with the processing of the training data, when some newer variations of data are provided, the ANN model can fail as it is not trained with such variations.

SUMMARY

In one embodiment, a method of optimizing artificial neural network (ANN) classification model and training data thereof for appropriate model behavior is disclosed. In one example, the method may include extracting a plurality of entities and a set of domain specific entities from the training data for each of a set of classes of the ANN classification model. The set of domain specific entities are representative of a set of domains. The method may further include determining a plurality of model parameters of the ANN classification model based on the training data. The method may further include determining missing data with respect to at least one of the training data and the plurality of model parameters based on the plurality of entities and the set of domain specific entities for each of the set of classes. The method may further include iteratively analysing a relative advantage of a modified ANN classification model with a modified training data with respect to the ANN classification model with the training data. The modified training data comprises one or more combinations of the training data and the missing data with respect to the training data. Similarly, the modified ANN classification model comprises a plurality of modified model parameters generated by tweaking or removing one or more of combinations of the plurality of model parameters and the missing data with respect to the plurality of model parameters. Further, the relative advantage provides for a criteria for determining a reliability of the ANN classification model and the training data. The method may further include determining an optimized ANN classification model and an optimized training data for appropriate model behavior based on the reliability.

In one embodiment, a system for of optimizing ANN classification model and training data thereof for appropriate model behavior is disclosed. In one example, the system may include at least one processor and a computer-readable medium coupled to the at least one processor. The computer-readable medium may store instructions, which on execution, may cause the at least one processor to extract a plurality of entities and a set of domain specific entities from the training data for each of a set of classes of the ANN classification model. The set of domain specific entities are representative of a set of domains. The processor-executable instructions, on execution, may further cause the at least one processor to determine a plurality of model parameters of the ANN classification model based on the training data, and to determine missing data with respect to at least one of the training data and the plurality of model parameters based on the plurality of entities and the set of domain specific entities for each of the set of classes. The processor-executable instructions, on execution, may further cause the at least one processor to iteratively analyse a relative advantage of a modified ANN classification model with a modified training data with respect to the ANN classification model with the training data. The modified training data comprises one or more combinations of the training data and the missing data with respect to the training data, while the modified ANN classification model comprises a plurality of modified model parameters generated by tweaking or removing one or more of combinations of the plurality of model parameters and the missing data with respect to the plurality of model parameters. Further, the relative advantage provides for a criteria for determining a reliability of the ANN classification model and the training data. The processor-executable instructions, on execution, may further cause the at least one processor to determine an optimized ANN classification model and an optimized training data for appropriate model behavior based on the reliability.

In one embodiment, a non-transitory computer-readable medium storing computer-executable instructions for of optimizing ANN classification model and training data thereof for appropriate model behavior is disclosed. In one example, the stored instructions, when executed by a processor, may cause the processor to perform operations including extracting a plurality of entities and a set of domain specific entities from the training data for each of a set of classes of the ANN classification model. The set of domain specific entities are representative of a set of domains. The operations may further include determining a plurality of model parameters of the ANN classification model based on the training data, and determining missing data with respect to at least one of the training data and the plurality of model parameters based on the plurality of entities and the set of domain specific entities for each of the set of classes. The operations may further include iteratively analysing a relative advantage of a modified ANN classification model with a modified training data with respect to the ANN classification model with the training data. The modified training data comprises one or more combinations of the training data and the missing data with respect to the training data. Similarly, the modified ANN classification model comprises a plurality of modified model parameters generated by tweaking or removing one or more of combinations of the plurality of model parameters and the missing data with respect to the plurality of model parameters. Further, the relative advantage provides for a criteria for determining a reliability of the ANN classification model and the training data. The operations may further include determining an optimized ANN classification model and an optimized training data for appropriate model behavior based on the reliability.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
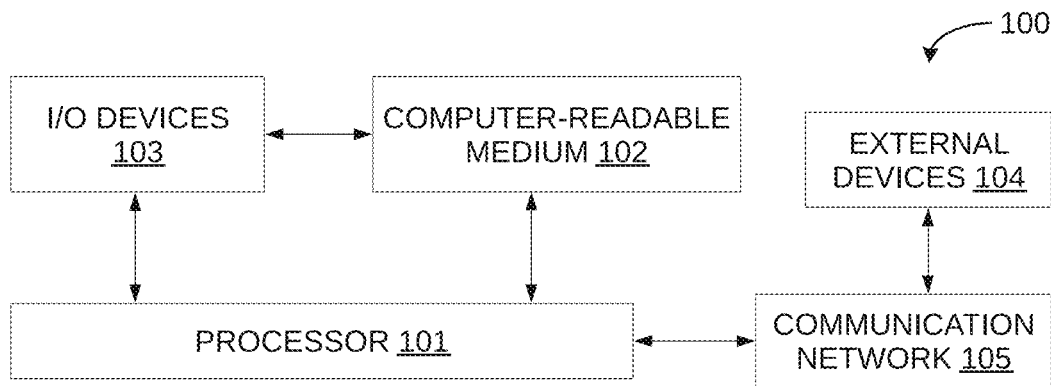
FIG. 1 is a block diagram of an exemplary system for optimizing artificial neural network (ANN) classification model and training data thereof for appropriate model behavior, in accordance with some embodiments of the present disclosure.

Referring now to FIG. 1, an exemplary system 100 for optimizing artificial neural network (ANN) classification model and training data thereof for appropriate model behavior is illustrated, in accordance with some embodiments of the present disclosure. As will be appreciated, the system 100 may build or implement an ANN classification model for a target application. Further, the system 100 may implement an assessment and optimization engine so as to optimize the ANN classification model and training data thereof for appropriate model behavior. In particular, the system 100 may take the form of any computing device (for example, server, desktop, laptop, notebook, netbook, tablet, smartphone, mobile phone, etc.) that may implement the assessment and optimization engine. It should be noted that, in some embodiments, the assessment and optimization engine may help in determining quality of training data for the ANN model for an appropriate or a desired model behavior.

As will be described in greater detail in conjunction with FIGS. 2-4, the system 100 may extract a plurality of entities and a set of domain specific entities from the training data for each of a set of classes of the ANN classification model. The set of domain specific entities are representative of a set of domains. The system 100 may then determine a plurality of model parameters of the ANN classification model based on the training data. The system 100 may further determine missing data with respect to at least one of the training data and the plurality of model parameters based on the plurality of entities and the set of domain specific entities for each of the set of classes. Further, the system 100 may iteratively analyse a relative advantage of a modified ANN classification model with a modified training data with respect to the ANN classification model with the training data. The modified training data comprises one or more combinations of the training data and the missing data with respect to the training data. Similarly, the modified ANN classification model comprises a plurality of modified model parameters generated by tweaking or removing one or more of combinations of the plurality of model parameters and the missing data with respect to the plurality of model parameters. Further, the relative advantage provides for a criteria for determining a reliability of the ANN classification model and the training data. The system 100 may then determine an optimized ANN classification model and an optimized training data for appropriate model behavior based on the reliability.

The system 100 may include one or more processors 101, a computer-readable medium (for example, a memory) 102, and input/output devices 103. The computer-readable storage medium 102 may store instructions that, when executed by the one or more processors 101, cause the one or more processors 101 to determine quality of the training data for the ANN model and to optimize the training data and the ANN classification model for an appropriate model behavior, in accordance with aspects of the present disclosure. The computer-readable storage medium 102 may also store various data (e.g., training data, ANN classification model, missing training data, model metadata or model parameters, missing model parameters, entities, domain specific entities, domains, classes, relative advantage values, optimized training data, optimized ANN classification model, etc.) that may be captured, processed, and/or required by the system 100. The system 100 may interact with a user (not shown) via input/output devices 103. For example, the system 100 may interact with a user via a user interface accessible via a display device. The system 100 may also interact with one or more external devices 104 over a communication network 105 for sending or receiving various data. The external devices 104 may include, but may not be limited to, a remote server, a digital device, or another computing system.

Figure 2:
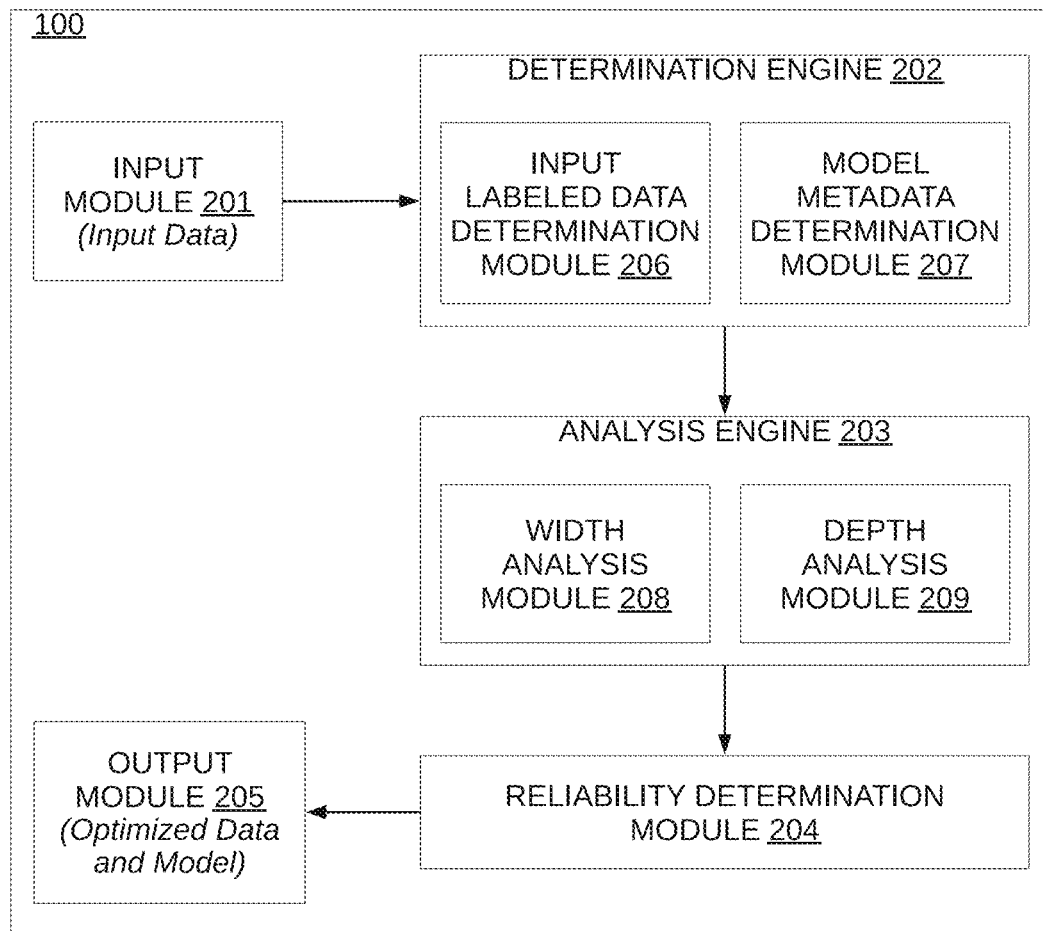
FIG. 2 is a functional block diagram of the system of FIG. 1, in accordance with some embodiments of the present disclosure.

Referring now to FIG. 2, a functional block diagram of the system 100 of FIG. 1, is illustrated in accordance with some embodiments of the present disclosure. The system 100 may include various modules that perform various functions so as to determine quality of the training data for the ANN model and to optimize the training data and the ANN classification model for an appropriate model behavior. In some embodiments, the system 100 may include an input module 201, a determination engine 202, an analysis engine 203, and a reliability determination module 204, and an output module 205. In some embodiments, the determination engine 202 may include an input labeled data determination module 206 and a model metadata determination module 207. Additionally, in some embodiments, the analysis engine 203 may include a width analysis module 208 and a depth analysis module 209. As will be appreciated by those skilled in the art, all such aforementioned modules 201-209 may be represented as a single module or a combination of different modules. Moreover, as will be appreciated by those skilled in the art, each of the modules and the database may reside, in whole or in parts, on one device or multiple devices in communication with each other.

The input module 201 may receive an ANN model and input data for the ANN classification model. In some embodiments, the input data may be training data for training the ANN classification model. The input data may include, but may not be limited to, text data, image data, or the like. The input module 201 may process the input data, and then feed the processed data along with the ANN classification model to the determination engine 202.

As stated above, the determination engine 202 may include the input labeled data determination module 206 and the model metadata determination module 207. The input labeled data determination module 206 receives the input data and extracts entities and domain specific entities from the input data for each of a set of classes of the ANN classification model. It should be noted that domain specific entities are representative of a set of domains. By way of an example, if the input data is text data, the input labeled data determination module 206 may extract the required domain related labeled data, entities like the important keywords, synonyms, antonyms, overlapped words, etc. from the input data. It should be noted that, initially, the stop-words are removed from the input text data. Further, the duplicates are removed to get a dictionary of unique words in the input text data. By way of further example, if the input data is image data, the input labeled data determination module 206 may extract features like two-dimensional (2D) lines, three-dimensional (3D) lines, curves, etc. which forms the entity. The object in the images are extracted using any known or proprietary object detection tools. These constitute the domain of the image data.

In case of text data, topic modelling techniques may be employed to identify the keywords. Using the existing semantic networks, the synonyms and antonyms may be obtained. The words which doesn't have any synonyms and antonyms may be considered as the domain specific or use-case specific words. In case of image data, based on the meta information of the extracted object extraction, the possible variation may be identified.

The model metadata determination module 207 may determine the model parameters of the ANN classification model based on the training data. In particular, the model metadata determination module 207 may extract model metadata information such as pooling layer (e.g., max-pool, min-pool, avg-pool), activation function used at each layer (e.g., sigmoid, tanh, ReLu, etc.), convolutional layer for feature extraction, normalization functions like Softmax, type of error propagation, regularization type, hyperparameters like learning rate, batch size, loss function, optimizer, etc. using input labelled data. For example, values of some of the model parameters may be determined based on the nature of the input data. Further, model parameters like activation function may be determined by the output range. Some of the model parameters may be determined by the type of use-case like the type of layer. These values are used by the analysis engine 203 for performing width and depth analysis on the impact of model.

By way of an example, values of some of the model parameters may be determined as follows. Type of layer, Optimizer type, Loss function type may be derived from initial input data quality assessment. Regularization function type, and Normalization function type may be derived from the initial input data range and output value range. Type of Network, and Type of layer may be derived from type of use-case. Batch size, and number of layers may be derived from host machine configuration.

The analysis engine 203 may determine missing data with respect to the training data and/or the plurality of model parameters based on the plurality of entities and the set of domain specific entities for each of the set of classes. As stated above, the analysis engine 203 may include the width analysis module 208 and the depth analysis module 209. The width analysis module 208 may perform the width analysis of the input data by considering model metadata (also referred to as model parameters) for assessing the representation of the data across the data domain, class, and entity. In some embodiments, number of layers, type of network, type of layer, etc. may be considered for the width analysis. Based on the nature of data, type of use-case, percentage of overlapped words, and coverage of variations, the width of the data may be determined.

The depth analysis module 209 may perform the depth analysis of the input data by considering model metadata for assessing the representation of the input data within each data domain, class, and entity. In some embodiments, optimizer, batch size, loss function, regularization function, normalization function, activation function, etc. may be considered for the depth analysis of the data.

The analysis module 203 provides the missing data with respect to the training data and/or the plurality of model parameters to the reliability determination module 204. The reliability determination module 204 may iteratively analyse a relative advantage of a modified ANN classification model with a modified training data with respect to the ANN classification model with the training data so as to provide optimized ANN classification model and training data thereof. By way of example, two different dataset are used to train two different ANN classification models with same metadata. By removing or changing each metadata of the ANN classification model, the results are determined for both the models. The relative advantage of one type of metadata over other with different data is determined. The same step is repeated by removing or changing domain, entity, and class values extracted in the data by keeping model metadata constant. The negatively impacted input data and model metadata from both the models are removed to achieve a better result.

The output module 205 may provide the optimized input data and optimized ANN classification model. As will be appreciated, better results may be achieved by employing the optimized ANN classification model that is trained with optimized training data.

It should be noted that the system 100 may be implemented in programmable hardware devices such as programmable gate arrays, programmable array logic, programmable logic devices, or the like. Alternatively, the system 100 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together but may include disparate instructions stored in different locations which, when joined logically together, comprise the engine and achieve the stated purpose of the engine. Indeed, an engine of executable code may be a single instruction, or many instructions, and may even be distributed over several different code segments, among different applications, and across several memory devices.

As will be appreciated by one skilled in the art, a variety of processes may be employed for optimizing ANN classification model and training data thereof for appropriate model behavior. For example, the exemplary system 100 may determine quality of the training data for the ANN model and may optimize the training data and the ANN classification model for an appropriate model behavior by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
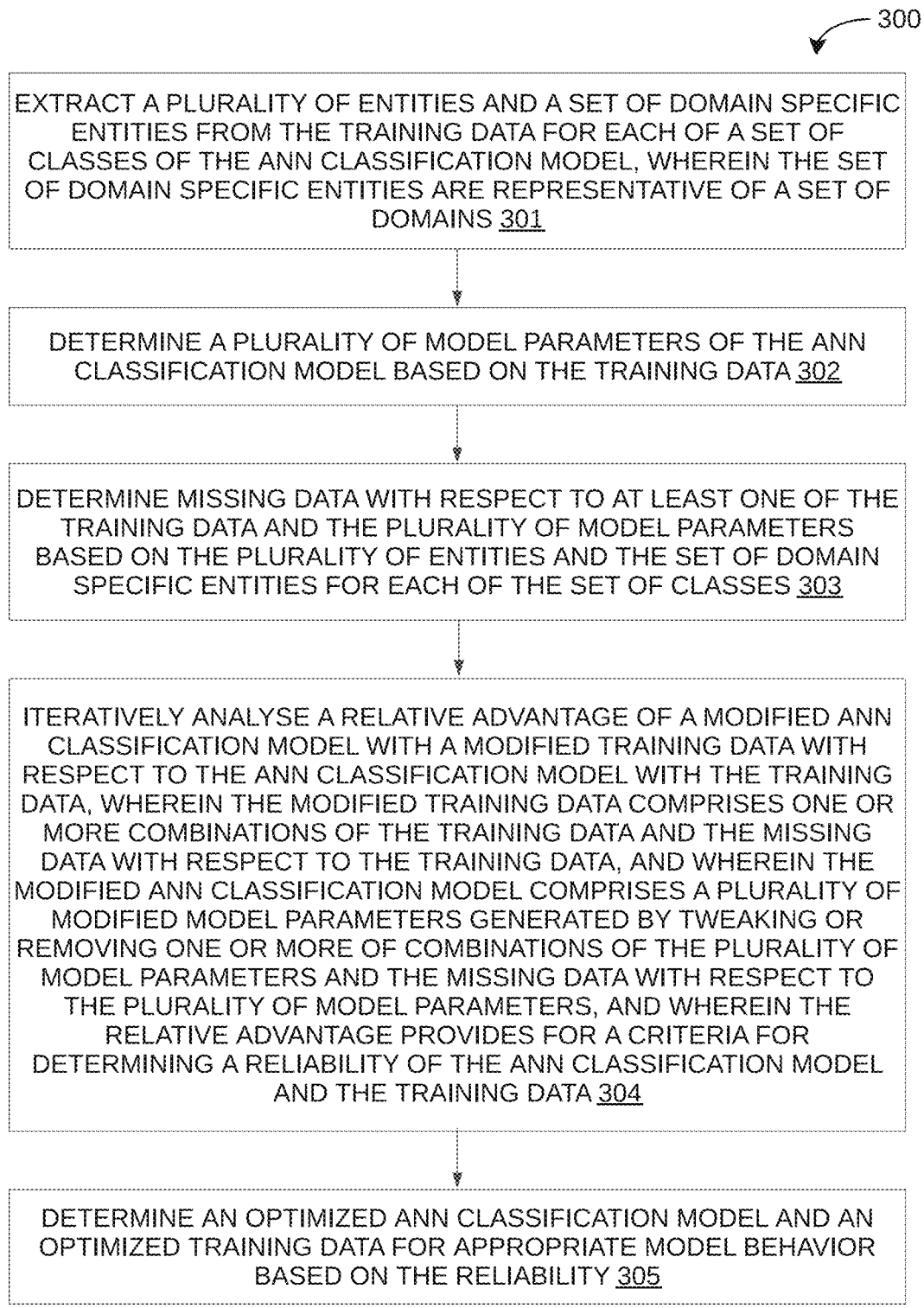
FIG. 3 is a flow diagram of an exemplary process for optimizing ANN classification model and training data thereof for appropriate model behavior, in accordance with some embodiments of the present disclosure.

For example, referring now to FIG. 3, exemplary control logic 300 for optimizing ANN classification model and training data thereof via a system, such as the system 100, is depicted via a flowchart, in accordance with some embodiments of the present disclosure. As illustrated in the flowchart, the control logic 300 may include the steps of extracting a plurality of entities and a set of domain specific entities from the training data for each of a set of classes of the ANN classification model at step 301. The set of domain specific entities are representative of a set of domains. The control logic 300 may further include determining a plurality of model parameters of the ANN classification model based on the training data at step 302 and determining missing data with respect to at least one of the training data and the plurality of model parameters based on the plurality of entities and the set of domain specific entities for each of the set of classes at step 303. The control logic 300 may further include iteratively analysing a relative advantage of a modified ANN classification model with a modified training data with respect to the ANN classification model with the training data at step 304. The modified training data comprises one or more combinations of the training data and the missing data with respect to the training data. Similarly, the modified ANN classification model comprises a plurality of modified model parameters generated by tweaking or removing one or more of combinations of the plurality of model parameters and the missing data with respect to the plurality of model parameters. Further, the relative advantage provides for a criteria for determining a reliability of the ANN classification model and the training data. The control logic 300 may further include determining an optimized ANN classification model and an optimized training data for appropriate model behavior based on the reliability at step 305.

In some embodiments, the plurality of entities and the set of domain specific entities from the training data includes keywords and domain specific keywords for text data. Additionally, in some embodiments, the plurality of entities and the set of domain specific entities from the training data includes objects and domain for image data. Further, in some embodiments, the plurality of model parameters includes at least one of a number of layers in the ANN classification model, a type of each layer, a type of the ANN classification model, an activation function type, a regularization function type, a normalization function type, a loss function type, a learning rate, a batch size, and an optimizer type.

In some embodiments, determining the plurality of model parameters at step 302 includes the step of determining a first set of the plurality of model parameters based on nature of the training data. Additionally, in some embodiments, determining the plurality of model parameters at step 302 includes the step of determining a second set of the plurality of model parameters based on at least one of: a range of the training data and a range of output data. Further, in some embodiments, determining the plurality of model parameters at step 302 includes the step of determining a third set of the plurality of model parameters based on a type of use case for the ANN classification model, Moreover, in some embodiments, determining the plurality of model parameters at step 302 includes the step of determining a fourth set of the plurality of model parameters based on a system configuration.

In some embodiments, determining the missing data at step 303 includes the step of performing a width analysis for assessing representation of training data across the set of domains, the plurality of entities, and the set of classes. Additionally, in some embodiments, determining the missing data at step 303 includes the step of performing a depth analysis for assessing representation of training data within the set of domains, the plurality of entities, and the set of classes.

In some embodiments, determining the missing data at step 303 includes the steps of clustering the plurality of entities into a set of sequential clusters based on a domain associated with each of the entities for each of the set of classes, grouping one or more similar classes from the set of classes based on a degree of overlap among the set of sequential clusters, determining a superset of domain specific entities in the one or more similar classes, determining a cluster affinity value for each of the set of sequential clusters in each of the set of set of classes based on the set of domain specific entities and the superset of domain specific entities, and determining, the missing data for each of the set of sequential clusters in each of the set of set of classes based on the cluster affinity value. In such embodiments, determining the missing data at step 303 further includes the step of generating similar entities and dissimilar entities for each of a set of entities in each of the set of sequential clusters in each of the set of set of classes using semantic network model.

In some embodiments, each of the iterative analysis at step 304 includes the steps of retaining one of the modified ANN classification model with the modified training data or the ANN classification model with the training data based on the relative advantage, and performing a next iteration with a retained ANN classification model and a retained training data.

Figure 4:
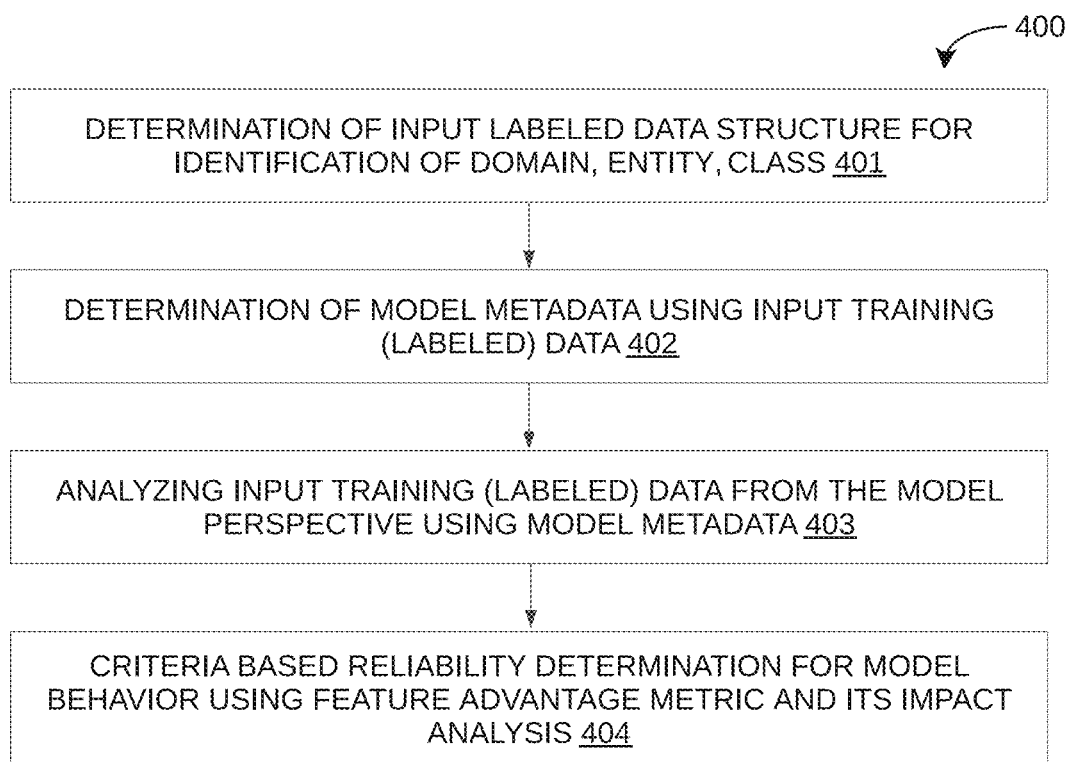
FIG. 4 is a flow diagram of a detailed exemplary process for optimizing ANN classification model and training data thereof for appropriate model behavior, in accordance with some embodiments of the present disclosure.

Referring now to FIG. 4, exemplary control logic 400 for optimizing ANN classification model and training data thereof for appropriate model behavior is depicted in greater detail via a flowchart, in accordance with some embodiments of the present disclosure. As illustrated in the flowchart, at step 401, the control logic 400 may perform determination of input labeled data structure (e.g., keywords, domain specific words, synonyms, antonyms, etc.) for identification of domain, entity, and class using the input labeled data determination module 206 of the determination engine 202. Input labeled data structure determination may help in getting the data distribution in the input dataset. The non-availability of the data variations across the domain, entity, and class may be determined. This information may be then used as the input for width and depth analysis at step 403, which may be then used in determining the reliability of the model at step 404. The step 401 is divided into multiple steps for the extraction of various values as described herein below.

With respect to input text data, the control logic 400 may, first, extract all the keywords, domain specific words, etc. using topic modelling techniques. The control logic 400 may then generate sequential clusters for each class based on the keywords extracted. The domain of each keyword may be a keyword determined by using the existing semantic networks like concept net. All the keywords that fall under the same domain are grouped into one cluster. Thus, per class, multiple such sequential clusters are formed. The above steps are repeated for all the classes labeled in the input data.

After finding the clusters for all the classes, using the KNN distance between the clusters, the control logic 400 may group the similar classes with a high overlap of domain clusters so as to find out the variation coverage. Then, the control logic 400 may determine the union of all the domain specific keywords from all the similar classes in a cluster. The control logic 400 may then check the data in each class in the cluster with the difference between the domain keywords they are already having to the keywords in the union. This difference may be considered as the cluster affinity value. For the clusters which are having just one class, the control logic 400 may generate all the synonyms and antonyms for all the keywords in that class by using the existing semantic networks. As will be appreciated, the semantic networks provide the list of synonyms, antonyms, domain and other relational information of a word. The control logic 400 may then take the union of keywords in that class so as to generate the synonyms and antonyms. The difference between the keywords and the union of keywords is taken to get all the missing words in the dataset for the particular class.

With respect to input image data, the control logic 400 may extract objects in the images using existing object detection algorithm. The metadata information extracted from the object detection may be used to identify the domain of the image and the features like lines, curves, color gradient, etc. may be extracted using the image processing libraries. The control logic 400 may then identify missing variation of the image based on the metadata information of image.

At step 402, the control logic 400 may perform determination of model metadata using input training (labeled) data using the model metadata determination module 207 of the determination engine 202. The selection of the model metadata may be done based on the input data. In particular, the control logic 400 may extract model parameters such as number of layers, type of layer, type of network, activation function type, regularization function type, normalization function type, loss function type, learning rate, batch size, optimizer type etc. from the network topology. Further, the values for some of these parameters may be determined based on the nature of input data like type of layer, optimizer type, loss function, etc. This metadata information may provide the need for context, position, and range of the metadata to the width and depth analysis performed at step 403, which may be then used to determine the reliability of an AI model at step 404. The step 402 is divided into multiple steps for the extraction of various values as described herein below.

First, the control logic 400 may determine initial inputs from the input data. For example, the control logic 400 may determine the type of data (whether the data is structured or unstructured) by using standard techniques. A free flow text is considered as unstructured data whereas a form like data is considered to be a structured data. The control logic 400 may then determine the initial matrix by taking the size of the input vector. The control logic 400 may further determine sparseness of the input vector by taking the difference between the highest and the lowest values in the input vector. The control logic 400 may further determine the overlap between each class with respect to the rest of the classes by taking the intersection of the list of keywords in all the classes of the labeled data. For example, if class "Laptop" has ["printer", "issue", "laptop"] keywords and class "Desktop" has ["printer", "issue", "desktop"] keywords, then the overlap between the 2 classes is 66.6% ["printer", "issue"]. This overlap in data determines the degree of non-linearity the data. The length of the input vector gives the number of input features given to the model. The control logic 400 may further determine host system configurations using standard system libraries provided by the operating system and the programming languages.

If the data is unstructured and the model is expected to predict the output based on historical data (regression), then a recurrent neural network (RNN) is required in order to learn the information in series. If the data is structured and a simple classification needs to be performed, then a convolutional neural network (CNN) is required. The number of convolutional layer or pooling layer is determined based on the initial matrix of the data. For example, if the input size of image is 240×240, and the number of possible classes are 4 or 5, then a higher number of layers are required. However, if the image size is 1900×1080 and the number of classes are 2, then a lesser number of layers are required. Typically, the control logic 400 may derive such information using a rule base or a knowledge base, which may be created based on expert knowledge gained through trial and error. Alternatively, the control logic 400 may derive such information using a feedback loop or learning.

The control logic 400 may determine the order of the layer and their hyper-parameters like the kernel size based on the size of the input matrix of the data (i.e., size of the input vector). For example, if the size of the image is 240×240 dimension, then the kernel size should be smaller like 3×3.

However, if the image size is 1900×1080 dimension, then a bigger kernel is chosen like 7×7 or 9×9.

Loss function and the optimizer function are used to determine the loss and to reduce it. The control logic 400 may determine these metadata based on the non-linearity of the input data labels. As discussed above, the non-linearity of the data may be determined using the percentage of the overlap of keywords. If the data is highly non-linear, then the optimizers like Adam or Adagrad may be used. However, if the data is having less overlap, then a simple SGD may be used.

Regularization function and normalization function are used to reduce the bias in the model while training. If the number of input features to the model is very high, then the regularization function is required. Based on the features and the parameters, the value of regularization function may also increase or decrease. These regularization value may be selected using any standard mathematical equations such as Tikhnov or Gradient descent approaches. These values are dependent on the range of the input data used.

If the values in the input vector are too sparse, then a very small value may be assigned to normalization function in order to avoid over-fitting of model. For example, let us consider that there are two inputs, x1 and x2. x1 data range varies from to 0 to 0.5 and x2 data range varies from 0 to 1000. A change of x1 of 0.5 is 100 percent change whereas a change of x2 by 0.5 is only a change of 0.05%. In such cases, normalization of parameters may be required in order to avoid bias towards any one feature. Any of the multiple normalization methodologies such as standard scaler, batch normalization, etc. may be employed. These functions are used to scale data inputs to have zero mean and unit variance.

The control logic 400 may determine some metadata like the hyperparameters based on the host machine configuration, where the model is trained. For example, if the host system has lesser computational power, then the batch size taken will be very less. The control logic 400 may employ above discussed approaches or combination of above discussed approaches so as to determine the other metadata information of the model. If the parameters which are required as part of the analysis are not present in the network, then these parameters are considered to be missing model meta-\data. The control logic 400 may send the metadata information extracted at step 402 and the input data information collected at step 401 to the analysis engine 203 to perform the analysis.

At step 403, the control logic 400 may analyze input training (labeled) data from the model perspective using model meta-data. In particular, the control logic 400 may perform width analysis by considering model metadata for assessing representation of input data across the identified domain, entity and class. Further, the control logic 400 may perform depth analysis by considering model metadata for assessing representation of input data within the identified domain, entity and class. The width analysis may be performed using the width analysis module 208 of the analysis engine 203, while the depth analysis may be performed using the depth analysis module 209 of the analysis engine 203.

In some embodiments, the model metadata information and the input data information extracted or determined in previous steps (i.e., step 401 and 402) may be considered as the points of a convex hull. It should be noted that a convex hull of a set of points is defined as the smallest convex polygon. The measure of one side of the convex hull ('s') is determined by the cosine distances between two vector points. The number of exterior points in the convex gives the number of sides ('n') in the convex hull. The area of the convex hull ('A') gives the initial width and depth score for the data for the existing model metadata. The area of the convex hull ('A') is determined as per equation (1) below:

$$A=(n \times s \times a)/2 \qquad \text{Equation (1)}$$

where, 'a' is Apothem (i.e., perpendicular line from any side of the polygon to its center).

The control logic 400 may then add the missing data or the missing model metadata determined in steps 401 and 402 to this convex hull. The area ('A') of the new convex hull will be the updated width and depth score for the modified data and/or modified model parameters. As will be appreciated, this step is performed for both width based and depth based parameters. As discussed above, the model parameters such as number of layers, type of network, type of layer, etc. may be used for assessing the representation of the input data across domain, entity, and class, which constitutes the width component of the data analysis. Similarly, as discussed above, model parameters like optimizer, batch size, loss function, regularization function, normalization function, activation function, etc. may be used for assessing the representation of input data within each domain, entity, and class, which constitutes the depth component of the data analysis.

It should be noted that all the model parameters are not mandatory for all type of data. Thus, only the relevant model parameters may be checked, and the corresponding values may be determined. The control logic 400 may then pass the width and depth dependent metadata values determined and the input data analysis values to the reliability determination module 204 to assess the impact on the model behavior.

At step 404, the control logic 400 may perform criteria-based reliability determination for model behavior using feature advantage metric and its impact analysis. In some embodiments, relative advantage may be employed as a criterion to determine the reliability. In particular, the relative advantage of a data feature or a meta-data of the model is determined for the both the input data and the model, without the data from width and depth analysis and with the data from width and depth analysis. Thus, based on the scores sent from the step 403, the impact of the data analysis on the model behavior is determined using the relative advantage of the missing data features or the missing model metadata parameters. The relative advantage of one over the other is determined using Balassa index. The control logic 400 may then compare the output (i.e., width and depth analysis value) of the model with the missing data features and model parameters (i.e., new value) with the output (i.e., width and depth analysis value) of the model without the missing features and parameters (i.e., original value). The difference between them based on the accuracy of the model serves as the criteria for determining the reliability of the model.

By way of an example, a standard input of reliability score for both original and new values may be considered as 1. In first step, new value obtained as well as the original value is divided by the original value, let us consider this as "Actual value". Then, the standard value of both new value and the original value both are divided by the original value, let us consider this as "Standard value". The standard value may be then compared with the actual value. Thus, the reliability score of the model is given as the percentage of the difference in the actual value and standard value. If the actual value is greater than the standard value, the new value is having relative advantage over the original value. If the advantage value is zero, then model is considered as Reliable.

By way of an overall example, let us consider a binary text classifier for a ticketing solution with class "Laptop" and class "Desktop". Let the keywords extracted from the input data be as follows:

Laptop=["printer", "faulty", "laptop", "dell", "hp", "connection", "error", "wireless"]

Desktop=["printer", "faulty", "desktop", "dell", "SAMSUNG", "connection", "error", "keyboard", "LAN"]

The overlap of the keywords may be found out by the intersection of the extracted keywords:

Overlap between "Laptop" and "Desktop"=["printer", "faulty", "laptop", "dell", "connection", "error"].

Thus, the overlap percentage=(6/11)*100=54.5%

Then, using the semantic networks like wordnet, the synonyms and antonyms of all the keywords are found out. The words like Samsung, HP, and Dell will not have any synonyms or antonyms, hence these are considered to be the domain specific words. Based on the KNN distance between the words, the similar words are grouped to multiple clusters and domain words will be moved to different cluster. The clusters of Laptop are very similar to the clusters of Desktop. Hence, both the class data may be used to determine the missing data. The missing synonyms, antonyms, and domain words for each class may be determined. For class Laptop, synonyms of "Faulty" like 'malfunctioning', 'broken', 'damaged', etc. are missing and the domain words like Samsung is missing. Similarly, the missing data is determined for all the classes.

Now, let the model topology consist of 2 convolutional layers and 2 max-pool layers with a kernel of 7×7 dimension. Let the optimizer used be the Adam optimizer. Now, based on the input data, the required model metadata information is determined. Let us assume that each word is encoded using a 400 dimension vector using Word2Vec technique.

Faulty=[0.23, 8.3, 100.65, 890.2 . . . −0.3]

Connection=[0.1, 7.5, 150.4, 930.3 . . . −0.5]

As the number of features are high (i.e., 400) a regularization function is required. However, in the model topology, the regularization is not present. So, the model will be overfit to the training data. This is found out by testing model with different variation of data which was missing from the input data. The input data range for different features are of different scale like the feature 1 is of the range 0.1 to 0.3 and the feature 4 is of the range 850 to 950. Let us assume that feature 1 is about the 'type of hardware' and feature 4 is on the 'issue' of the word. As there is huge difference between the data range, the model might get biased towards feature 4. Even when the 'issue' is there with respect to a Laptop and if the value of feature 4 is high, the chances of misclassification increases. Hence, a Normalization function is required, which is missing from the classification model. In this way, all the metadata information from the model is extracted and even the missing values are determined.

Once all the data is determined both from data and model, the width and depth analysis may be performed. The values of each of the feature and the meta-data is used to create a convex hull and its area is calculated. Then the missing information is added, and the new area of the convex hull may be calculated again. The relative advantage of existing data and model may be compared with the data and model with added missing values. Let us assume that the area of the convex hull of model without any modification is 0.64 and the area of the convex hull of model after adding all the missing data and model parameter is 0.84. The relative advantage of model may be then computed using Balassa index as below. A standard value of 1 is considered for both the model values.

Step 1: Calculating 'Actual Values':
0.849/0.645=1.317
0.645/0.645=1

Step 2: Calculating 'Standard Values':
1/1=1
1/1=1

Step 3: Comparing 'Standard values' with the 'Actual value' to determine the reliability score
1.317−1=0.317

Thus, the new model is 31.7% more reliable than the old model.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
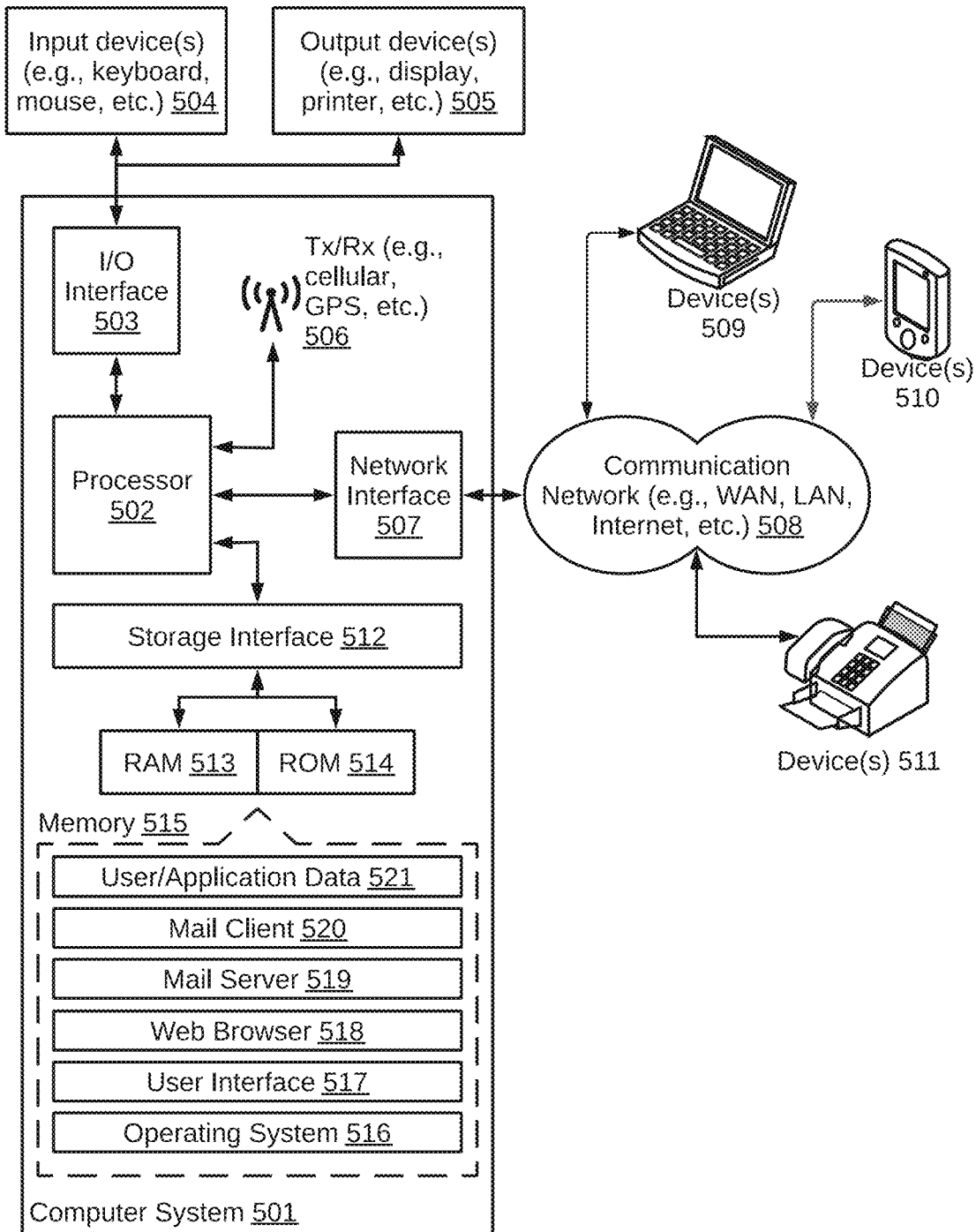
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing system 100 for optimization of ANN classification model and training data for appropriate model behavior. Computer system 501 may include a central processing unit ("CPU" or "processor") 502. Processor 502 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., TEXAS INSTRUMENTS® WILINK WL1283®, BROADCOM® BCM47501UB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK®, etc.), laptop computers, notebooks, gaming consoles (MICROSOFT® XBOX®, NINTENDO® DS®, SONY® PLAYSTATION®, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathlnterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, APPLE® MACINTOSH® operating systems' AQUA®, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 501 may implement a web browser 518 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 501 may implement a mail server 519 stored program component. The mail server may be an Internet mail server such as MICROSOFT® EXCHANGE®, or the like. The mail server may utilize facilities such as ASP, ActiveX, ANSI C++/C#, MICROSOFT .NET®, CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 501 may implement a mail client 520 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 501 may store user/application data 521, such as the data, variables, records, etc. (e.g., training data, ANN classification model, missing training data, model metadata or model parameters, missing model parameters, entities, domain specific entities, domains, classes, relative advantage values, optimized training data, optimized ANN classification model, etc.) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above are not routine, or conventional, or well understood in the art. The techniques discussed above provide for analyzing the impact of training data on the model behavior. In particular, the techniques provide for determination of quality of input training data (in terms of completeness, sufficiency, coverage of variations, etc.) for appropriate model behavior. As will be appreciated, the analysis of input data (e.g., text data or image data) for determining model behavior may help the end user to provide proper data to the ANN classification model, thereby resulting in a better accuracy. Additionally, the techniques discussed above uses multiple datasets to check the relative advantage of one over other with different model meta-data. In other words, the techniques iteratively analyze the relative advantage of input data and model metadata of different models to get the best combination of input data and model metadata so as to achieve higher accuracy. Further, the techniques facilitate in detecting and removing duplicate and unnecessary data from the input data so as to make it even more efficient for the ANN classification model to learn quickly. Moreover, the techniques may be easily deployed in any cloud-based servers for access and use as an 'application as a service' by any computing device including mobile device. For example, the system may be implemented on a cloud-based server and used by any connected computing device for optimizing the ANN classification model and training data thereof for appropriate model behavior. By way of an exemplary use-case, the techniques described above may be deployed to provide a service where the user can get matching content seamlessly that can be blended with what is being watched.

The specification has described method and system for optimization of ANN classification model and training data for appropriate model behavior. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable media may be utilized in implementing embodiments consistent with the present disclosure. A computer-readable medium refers to any type of physical memory on which information or data readable by a processor may be stored. Thus, a computer-readable medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of optimizing artificial neural network (ANN) classification model and training data thereof for appropriate model behavior, the method comprising:

extracting, by a system for optimizing an ANN classification model and training data thereof, a plurality of entities and a set of domain specific entities from the training data for each of a set of classes of the ANN classification model, wherein the set of domain specific entities are representative of a set of domains;

determining, by the system, a plurality of model parameters of the ANN classification model based on the training data;

determining, by the system, missing data with respect to at least one of the training data and the plurality of model parameters based on the plurality of entities and the set of domain specific entities for each of the set of classes, wherein determining the missing data comprises:

clustering, by the system, the plurality of entities into a set of sequential clusters based on a domain associated with each of the entities for each of the set of classes;

grouping, by the system, one or more similar classes from the set of classes based on a degree of overlap among the set of sequential clusters;

determining, by the system, a superset of domain specific entities in the one or more similar classes;

determining, by the system, a cluster affinity value for each of the set of sequential clusters in each of the set of set of classes based on the set of domain specific entities and the superset of domain specific entities; and determining, by the system, the missing data for each of the set of sequential clusters in each of the set of set of classes based on the cluster affinity value;

iteratively analysing, by the system, a relative advantage of a modified ANN classification model with a modified training data with respect to the ANN classification model with the training data, wherein the modified training data comprises one or more combinations of the training data and the missing data with respect to the training data, and wherein the modified ANN classification model comprises a plurality of modified model parameters generated by tweaking or removing one or more of combinations of the plurality of model parameters and the missing data with respect to the plurality of model parameters, and wherein the relative advantage provides for a criteria for determining a reliability of the ANN classification model and the training data with respect to the modified ANN classification model and the modified training data;

determining, by the system, an optimized ANN classification model and an optimized training data for appropriate model behavior based on the reliability; and deploying, by the system, the optimized ANN classification model and the optimized training data in at least one of a computer vision task, an image recognition task, natural language processing task, speech recognition task, or a decision making task that represents the appropriate model behavior.

2. The method of claim 1, wherein the plurality of entities and the set of domain specific entities from the training data comprises one of:

keywords and domain specific keywords for text data; and
objects and domain for image data.

3. The method of claim 1, wherein the plurality of model parameters comprises at least one of a number of layers in the ANN classification model, a type of each layer, a type of the ANN classification model, an activation function type, a regularization function type, a normalization function type, a loss function type, a learning rate, a batch size, and an optimizer type.

4. The method of claim 1, wherein determining the plurality of model parameters comprises:

determining, by the system, a first set of the plurality of model parameters based on nature of the training data;

determining, by the system, a second set of the plurality of model parameters based on at least one of: a range of the training data and a range of output data;

determining, by the system, a third set of the plurality of model parameters based on a type of use case for the ANN classification model; and determining, by the system, a fourth set of the plurality of model parameters based on a system configuration, wherein the system configuration is determined using standard system libraries provided by an operating system and programming languages associated with the system configuration.

5. The method of claim 1, wherein determining the missing data comprises performing, by the system, at least one of:

a width analysis for assessing representation of the training data across the set of domains, the plurality of entities, and the set of classes; and a depth analysis for assessing representation of the training data within the set of domains, the plurality of entities and the set of classes.

6. The method of claim 1, wherein determining the missing data comprises:

generating, by the system, similar entities and dissimilar entities for each of a set of entities in each of the set of sequential clusters in each of the set of set of classes using semantic network model.

7. The method of claim 1, wherein each of the iterative analysis comprises:

retaining one of the modified ANN classification model with the modified training data or the ANN classification model with the training data based on the relative advantage; and performing a next iteration with a retained ANN classification model and a retained training data.

8. A system for optimizing artificial neural network (ANN) classification model and training data thereof for appropriate model behavior, the system comprising:

at least one processor; and a computer-readable medium storing instructions that, when executed by the at least one processor, cause the at least one processor to perform operations comprising:

extracting a plurality of entities and a set of domain specific entities from the training data for each of a set of classes of the ANN classification model, wherein the set of domain specific entities are representative of a set of domains;

determining a plurality of model parameters of the ANN classification model based on the training data;

determining missing data with respect to at least one of the training data and the plurality of model parameters based on the plurality of entities and the set of domain specific entities for each of the set of classes, wherein determining the missing data comprises:

clustering the plurality of entities into a set of sequential clusters based on a domain associated with each of the entities for each of the set of classes;

grouping one or more similar classes from the set of classes based on a degree of overlap among the set of sequential clusters;

determining a superset of domain specific entities in the one or more similar classes;

determining a cluster affinity value for each of the set of sequential clusters in each of the set of set of classes based on the set of domain specific entities and the superset of domain specific entities; and determining the missing data for each of the set of sequential clusters in each of the set of set of classes based on the cluster affinity value;

iteratively analysing a relative advantage of a modified ANN classification model with a modified training data with respect to the ANN classification model with the training data, wherein the modified training data comprises one or more combinations of the training data and the missing data with respect to the training data, and wherein the modified ANN classification model comprises a plurality of modified model parameters generated by tweaking or removing one or more combinations of the plurality of model parameters and the missing data with respect to the plurality of model parameters, and wherein the relative advantage provides for a criteria for determining a reliability of the ANN classification model and the training data with respect to the modified ANN classification model and the modified training data;

determining an optimized ANN classification model and an optimized training data for appropriate model behavior based on the reliability; and deploying, by the system, the optimized ANN classification model and the optimized training data in at least one of a computer vision task, an image recognition task, natural language processing task, speech recognition task, or a decision making task that represents the appropriate model behavior.

9. The system of claim 8, wherein the plurality of entities and the set of domain specific entities from the training data comprises one of:
keywords and domain specific keywords for text data; and objects and domain for image data; and
wherein the plurality of model parameters comprises at least one of a number of layers in the ANN classification model, a type of each layer, a type of the ANN classification model, an activation function type, a regularization function type, a normalization function type, a loss function type, a learning rate, a batch size, and an optimizer type.

10. The system of claim 8, wherein determining the plurality of model parameters comprises:
determining a first set of the plurality of model parameters based on nature of the training data;
determining a second set of the plurality of model parameters based on at least one of: a range of the training data and a range of output data;
determining a third set of the plurality of model parameters based on a type of use case for the ANN classification model; and
determining a fourth set of the plurality of model parameters based on a system configuration, wherein the system configuration is determined using standard system libraries provided by an operating system and programming languages associated with the system configuration.

11. The system of claim 8, wherein determining the missing data comprises performing at least one of:
a width analysis for assessing representation of the training data across the set of domains, the plurality of entities, and the set of classes; and
a depth analysis for assessing representation of the training data within the set of domains, the plurality of entities, and the set of classes.

12. The system of claim 8, wherein determining the missing data comprises:
generating similar entities and dissimilar entities for each of a set of entities in each of the set of sequential clusters in each of the set of set of classes using semantic network model.

13. The system of claim 8, wherein each of the iterative analysis comprises:
retaining one of the modified ANN classification model with the modified training data or the ANN classification model with the training data based on the relative advantage; and
performing a next iteration with a retained ANN classification model and a retained training data.

14. A non-transitory computer-readable medium storing computer executable instructions for optimizing artificial neural network (ANN) classification model and training data thereof for appropriate model behavior, the computer-executable instructions configured for:
extracting a plurality of entities and a set of domain specific entities from the training data for each of a set of classes of the ANN classification model, wherein the set of domain specific entities are representative of a set of domains;
determining a plurality of model parameters of the ANN classification model based on the training data;
determining missing data with respect to at least one of the training data and the plurality of model parameters based on the plurality of entities and the set of domain specific entities for each of the set of classes, wherein determining the missing data comprises:
clustering the plurality of entities into a set of sequential clusters based on a domain associated with each of the entities for each of the set of classes;
grouping one or more similar classes from the set of classes based on a degree of overlap among the set of sequential clusters;
determining a superset of domain specific entities in the one or more similar classes;
determining a cluster affinity value for each of the set of sequential clusters in each of the set of set of classes based on the set of domain specific entities and the superset of domain specific entities; and
determining the missing data for each of the set of sequential clusters in each of the set of set of classes based on the cluster affinity value;
iteratively analysing a relative advantage of a modified ANN classification model with a modified training data with respect to the ANN classification model with the training data, wherein the modified training data comprises one or more combinations of the training data and the missing data with respect to the training data, and wherein the modified ANN classification model comprises a plurality of modified model parameters generated by tweaking or removing one or more of combinations of the plurality of model parameters and the missing data with respect to the plurality of model parameters, and wherein the relative advantage provides for a criteria for determining a reliability of the ANN classification model and the training data with respect to the modified ANN classification model and the modified training data;
determining an optimized ANN classification model and an optimized training data for appropriate model behavior based on the reliability; and
deploying, by the system, the optimized ANN classification model and the optimized training data in at least one of a computer vision task, an image recognition task, natural language processing task, speech recognition task, or a decision making task that represents the appropriate model behavior.

15. The non-transitory computer-readable medium of the claim 14, wherein determining the plurality of model parameters comprises:
determining a first set of the plurality of model parameters based on nature of the training data;
determining a second set of the plurality of model parameters based on at least one of: a range of the training data and a range of output data;
determining a third set of the plurality of model parameters based on a type of use case for the ANN classification model; and
determining a fourth set of the plurality of model parameters based on a system configuration, wherein the system configuration is determined using standard system libraries provided by an operating system and programming languages associated with the system configuration.

16. The non-transitory computer-readable medium of the claim 14, wherein determining the missing data comprises performing at least one of:
a width analysis for assessing representation of the training data across the set of domains, the plurality of entities, and the set of classes; and a depth analysis for assessing representation of the training data within the set of domains, the plurality of entities, and the set of classes.

17. The non-transitory computer-readable medium of the claim 14, wherein each of the iterative analysis comprises:
retaining one of the modified ANN classification model with the modified training data or the ANN classification model with the training data based on the relative advantage; and
performing a next iteration with a retained ANN classification model and a retained training data.

* * * * *